Aug. 14, 1973     H. ALDER     3,752,704

SELF-SEALING BATTERY WITH NONAQUEOUS ELECTROLYTE

Filed Nov. 22, 1971

INVENTOR
HANSPETER ALDER

BY John R. Powell

ATTORNEY

United States Patent Office 3,752,704
Patented Aug. 14, 1973

---

3,752,704
SELF-SEALING BATTERY WITH NONAQUEOUS ELECTROLYTE

Hanspeter Alder, Newark, Del., assignor to E. I. du Pont de Nemours and Company, Wilmington, Del.
Continuation-in-part of abandoned application Ser. No. 80,050, Oct. 12, 1970. This application Nov. 22, 1971, Ser. No. 200,728
Int. Cl. H01m 35/04
U.S. Cl. 136—6 B            13 Claims

ABSTRACT OF THE DISCLOSURE

A galvanic battery comprising a plurality of series connected galvanic cells each of which contains a liquid, nonaqeuous electrolyte in contact with the electrolyte of the other cells has increased wet-stand life resulting from increased intercell electrical resistance obtained by: (1) restricting the area and increasing the length of intercell channels through the use of cell spacing gaskets composed of a material swellable in the electrolyte to the extent of from 1% to 10% linearly and (2) further restricting the intercell channels by employing electrolytes and electrolyte solvents so constituted that deposition of cell discharge products occurs in said restricted area, further restricting said channels, thereby progressively eliminating intercell shorting.

CROSS REFERENCE TO RELATED APPLICATIONS

This application is a continuation-in-part of copending application Ser. No. 80,050 filed Oct. 12, 1970, now abandoned.

BACKGROUND OF THE INVENTION

Galvanic batteries are known which have a common aqueous, liquid electrolyte and a plurality of series connected cells so disposed in the battery that there is a cell-to-cell electrical connection through the ionically conductive electrolyte. For example, Kirk et al. in U.S. 3,177,099 disclose such battery useful for submerged operation, e.g. for powering torpedo motors. Sea water flowing through and connecting all the cells of their battery is disclosed as an electrolyte.

A major problem inherent in such battery is intercell shorting through the common, conductive electrolyte. The battery is, therefore, inherently continuously self-discharging.

Expedients proposed for minimizing this intercell shorting include increasing the electrical resistance of the electrolyte channel between cells. For example, Kirk et al. apparently take advantage of the fact that the resistance of a column of electrolyte is inversely proportional to the column cross sectional area. They utilize electrolyte feed and discharge manifolds which reduce the area of the electrolyte channel between cells.

While a battery with such an expedient is simple to prepare and fill with electrolyte and minimizes self-shorting, it does not completely eliminate it and the continuous self-discharging penalty remains. Such battery is intended to be filled with electrolyte and quickly put in service before the intercell shorting uses up active electrode material to the extent that the battery becomes useless. Thus, the wet-stand life, i.e. shelf-life of such battery after filling, is, at best, limited.

It is an object of this invention to provide reduced intercell shorting in a common electrolyte battery, to improve wet-stand life, to produce a battery with a practical wet-stand life and to maintain the simplicity of manufacture and filling with electrolyte which is an advantageous feature of such battery.

These and other objects are attained by this invention as described and illustrated hereinafter.

SUMMARY OF THE INVENTION

In summary, this invention is directed to an improved galvanic battery with good intercell electrical resistance comprising a plurality of series-connected cells, a common electrolyte and means for electrolyte transfer between cells, in which each of the cells comprises an anode and a cathode with a portion of said common electrolyte disposed therebetween, said improvement comprising (1) spacing gaskets between the cells, composed of a material swellable in said electrolyte to the extent of from 1% to 10% linearly thereby narrowing intercell channels, and (2) employing as the common electrolyte a non-aqueous electrolyte having a conductivity of less than about $5 \times 10^{-2}$ ohm$^{-1}$ cm.$^{-1}$ and a limited solubility for discharge products of the cells such that the concentration of said discharge products exceeds their solubility causing deposits of cell discharge products in the intercell channels.

There results a self-sealing, common electrolyte battery having extended wet stand life and the added advantages of simplicity and low cost manufacture due to the simplicity of filling the cells all at the same time with electrolyte and no requirements for sealing the cells apart by externally applied sealing means.

DESCRIPTION OF THE INVENTION

Figure 1:
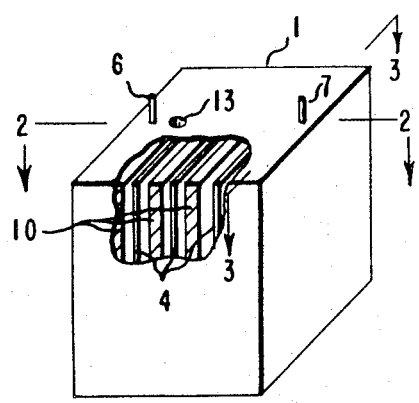
FIG. 1 shows a perspective view of an embodiment of the battery of this invention with a partially cut away battery case.

Referring again to the drawings, FIG. 1 shows battery case 1 cut away to present an interior view of a four-cell battery in which the electrically conductive, electrolyte impermeable plates 4 are separated by spacers 10. The most distant conductive plates (not shown) are electrically conductively attached to negative battery lead 6 and positive battery lead 7.

Figure 2:
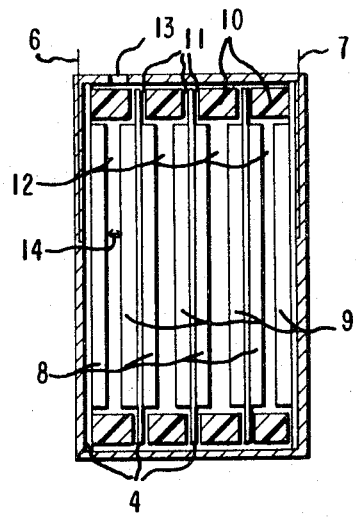
FIG. 2 shows a cross-section of the battery of FIG. 1 taken along line 2—2.

FIG. 2 shows anode electrodes 8 and cathode electrodes 9 fixedly attached to electrically conductive plates 4 in opposing relationship. Series connections within the battery are provided by conductive plates 4. Such electrodes attached to and separated by an impermeable conductive plate are known as bipolar electrodes. The plate serves to physically separate the electrochemically active anode and cathode material. Conductive plates 4 extend beyond the edge boundary of the attached anode and cathode so as to create a barrier causing an increase of the ion path length through the electrolyte between the anode and cathode of the bipolar electrode. Spacers 10 of non-conductive, inert material which swells when wet with electrolyte, serve to substantially fill the spaces defined by the electrode edges and the extending edges of the conductive plates 4, thereby reducing the cross-sectional area of the intercell ion channels 11 through the electrolyte between the cathode 9 and anode 8 of the bipolar electrode. Electrolyte diffusion between the intercell channels 11 is thereby reduced. Spacers 10 as rigid or semirigid bodies also serve to space apart the electrodes. It will be appreciated that at the time of assembly, spacers 10 do not so completely fill said spaces that the battery cannot be filled with electrolyte.

Figure 3:
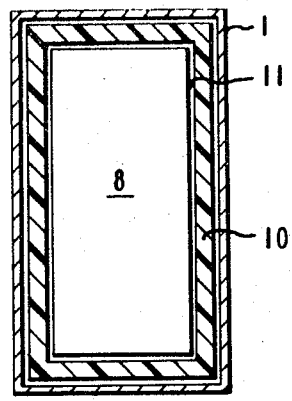
FIG. 3 shows a cross-section of the battery of FIG. 1 taken along line 3—3.

FIG. 3 shows a face view of an electrode 8 or 9, a portion of the channel 11 defined by the edge of the space filling spacer 10 and the edge of the electrode 8 or 9, said spacer surrounding the electrode which electrode is in turn attached to one of the conductive plates 4.

The battery is filled with electrolyte through opening 13 to fill intercell channels 11 and spaces 12 between the bipolar electrodes and end electrodes.

It will be appreciated that series connection in said battery is conveniently achieved by utilizing bipolar electrodes. Other art known means of series connection would be operable for this invention so long as the intercell electrolyte channels are comparably restricted.

In like manner batteries incorporating more or fewer cells can similarly utilize the concept of the invention.

As long as the intercell resistance between electrodes across the intracell path 14 is less than the intercell resistance along the channel 11, the battery will operate as a series connected battery of cells. That is, the voltage measure between external contacts 6 and 7 will be greater than the voltage delivered by an individual cell. However, as long as channel 11 is not blocked and is filled with electrolyte there will be intercell shorting. As discussed above, such intercell shorting reduces wet-stand life of the battery by continuously using up electrode material.

Since both intracell and intercell electrical resistances are defined by $$R = \sigma \frac{L}{A}$$

where R is the path resistance in ohms, $\sigma$ is the resistivity of the electrolyte in ohm-cm., L is path length through the electrolyte in cm. and A is path area in cm.$^2$, it can be seen that it is possible to control these relative resistivities so that intercell resistance will be greater than intracell resistance. For example, close spacing and parallel spacing of the flat electrodes 8 and 9 and their relatively large area afford a low resistance, short-length, high area ion path 14. Conversely restricting channel 11 by means of swellable spacer 10 and increasing the channel length by adjusting how far above the anode and cathode material plate 4 extends, affords a relatively high-resistance, low area and long-length ion channel. If ion channel 11 becomes substantially blocked by deposits and by swelling of the spacer 10 during intercell or during whole battery discharge, intercell shorting is substantially reduced to the point of practically stopping intercell shorting.

The deposit blocking of channels 11 is believed to depend on a discharge product solubility and resultant local discharge product concentration variations in the battery. Thus, in the relatively large volume of electrolyte in space 12 convection currents in the electrolyte are apparently sufficient to at least partially solubilize and to keep discharge products away from electrode faces so that said faces are free enough of deposits to function. However, in the restricted channel 11 diffusion of the electrolyte into and out of space 12 is restricted, supersaturation of such products results in laying down of deposits in the channel, caused either by deposits of the partially soluble discharge products, or by precipitation of a solid electrolyte salt from a "salting out" effect due to the locally increased discharge product concentrations, or by both. The reduced diffusion of the electrolyte to and from the restricted channel thus is not adequate to permit the resolution or sweeping out of such deposits in the restricted channels into the larger volume of space 12.

In any event it is required that the discharge products have limited solubilities in the non-aqueous electrolyte. An advantage of non-aqueous electrolytes is that they usually are poorer solvents for both discharge products and other materials, e.g. electrolyte salts, than are aqueous solvents. Also non-aqueous electrolytes are more likely than water to cause swelling of the polymeric materials used for spacers.

The materials used for spacers must be non-conductive and non-reactive with the active anode metal and the electrolyte and any other component of the battery. Polyethylene, polypropylene, polytetrafluoroethylene and copolymers of polyethylene or polypropylene with polyvinyl acetate are satisfactory materials for making spacers for batteries of the invention. The spacers must swell linearly from 1% to 10% in the battery electrolyte, ideally about 5%. Polyvinyl acetate in some electrolyte solvents swells too much and might partially disintegrate; however, familiar copolymers of ethylene and vinyl acetate containing 5% to 30% vinyl acetate are satisfactory in many solvents. Other polymers such as polyesters or polyamides are also satisfactory in appropriate solvents.

Spacer material must be used with solvents which have the property of causing adequate linear swelling of that material. Proper combination of solvent and spacer material is essential. Their selection is based on pretesting as shown in Example 3 herein.

Of course any swelling of electrodes during discharge can also aid in blocking channel 11 by closing the gap between the edge of cathode 9 or anode 8 and the edge of spacer 10. It is therefore preferred that such electrode edges form a portion of the wall or walls of said channel 11. Certain cathode structures in particular can swell during discharge and it is advantageous to utilize such structures.

The invention is directed to batteries having anodes comprising the light metals of Group I–A, II–A or III–A of the Periodic Table, e.g. lithium, sodium, potassium, beryllium, magnesium, calcium or aluminum, a non-aqueous electrolyte non-reactive towards such metals and a depolarizing cathode compatible therewith, i.e. a cathode which is non-reactive towards the anode metals, the electrolyte and other battery components. Particularly preferred is a lithium anode battery.

Non-aqueous electrolytes which are normally liquid at battery operating temperatures and have a conductivity of less than about $5 \times 10^{-2}$ ohm$^{-1}$ cm.$^{-1}$ usually comprise a conductive salt dissolved in a non-aqueous solvent. Representative useful electrolytes are disclosed, for example, by Shaw et al. in U.S. Pat. 3,393,093, by Methlie in U.S. Pat. 3,415,687 and by Gabano et al. in U.S. Pat. 3,511,-716. Still other suitable electrolytes include, for example, solutions of lithium perchlorate in tetrahydrofuran or tetrahydropyran or hexafluorophosphates of lithium, sodium, potassium or magnesium in these latter two cyclic ethers. Preferred because of conductivities greater than $10^{-3}$ ohm$^{-1}$ cm.$^{-1}$ but less than $5 \times 10^{-2}$ ohm$^{-1}$ cm.$^{-1}$, and because of their high degree of inertness towards active anode metals such as lithium, are solutions comprising lithium perchlorate dissolved in tetrahydrofuran or tetrahydropyran or a mixture of tetrahydrofuran and 1,2-dimethoxyethane and lithium hexafluorophosphate dissolved in methyl acetate. The high resistivity of such electrolytes further increases intercell resistance in the batteries.

Another preferred electrolyte comprises a solution of lithium perchlorate in 1,3-dioxolane containing a minor amount (up to about 1%) of 3,5-dimethylisoxazole.

As disclosed in Example 3 herein tetrahydrofuran is a more powerful swelling agent for the more common spacer materials than most of the other commonly used solvents. Polyvinylacetate and its combination with polyethylene is seen to swell adequately in all of the listed solvents save propylene carbonate. Higher temperatures increase the rate at which spacer swelling takes place, and batteries after filling and sealing may advantageously be held at slightly elevated temperature (35° C. to 50° C.) for a predetermined time to cause faster blockage of intercell channels by the co-agency of spacer swelling and discharge product precipitation.

Useful depolarizing cathode materials may vary widely provided they are reducible by the anode metal and are otherwise non-reactive with the other battery components. Representative useful depolarizing cathode materials include, for example, cupric sulfide, cuprous sulfide, cuprous oxide, cupric oxide, basic cupric carbonate, cupric oxalate, cupric tartrate, nickel fluoride, nickel oxalate, silver fluoride, cadmium fluoride and the like. Cathodes consisting essentially of cupric sulfide, i.e. containing about 90% or more CuS are preferred because they can be readily fabricated into highly conductive, high-output, relatively rigid structures easily placed into good electrical contact with conductive plates. Cupric sulfide is also a preferred cathode material because it tends to swell during discharge and thereby to facilitate blocking of intercell channels.

It will be clear to those skilled in the art that batteries of the present invention can vary widely in form, materials of construction, methods of construction and numbers of cells. The only requirements are those set forth above, e.g. close intracell electrode spacing relative to intercell path length, restricted intercell paths, limited solubility of discharge products in the electrolyte, and electrode spacers swellable in the electrolyte.

A flat stack, battery configuration as described in Example 1 is preferred because of easy preparation of components and easy battery assembly. Relatively thin electrodes are also preferred because they are relatively easily prepared and usually provide high active material utilization during discharge.

It will be appreciated that bipolar electrodes can be prepared by placing back-to-back two separate plates to which anode and cathode have been attached.

Evacuation of the battery before filling with electrolyte and pressurization after filling facilitates complete filling of all cells. Filling completion can be determined from known internal battery volume, electrolyte specific gravity and battery weight before and after filling. After filling, hole 13 is sealed and the battery is ready for services outside the protective argon atmosphere.

EXAMPLES

Example 1

A mixture of 1:1 atom ratio of sublimed sulfur and electrolytic copper powders, the mixture containing 3% by weight of carbon black, was aged in air 32 days at about 25° C. A nickel metal mesh patch measuring 3.5 x 1.9 centimeters was spot welded centrosymmetrically to each of five No. 304 stainless steel plates measuring 3.93 x 2.28 x 0.01 centimeters cupric sulfide cathodes measuring 3.7 x 2.0 x 0.1 centimeters and each containing 0.90 ampere hour of cupric sulfide were centrosymmetrically attached to each of the five plates by die pressing at 700 kilograms per square centimeter gauge pressure, about a 1.6 gram portion of the aged sulfur-copper-carbon mixture onto the screen side of each plate and then heating the plate and pressed cake of mixture between 3 nickel plates maintained at about 225° C. for 4 minutes. In a dry argon atmosphere 5 lithium anodes each measuring 3.4 x 1.8 x 0.1 centimeters and containing 1.20 ampere-hour of lithium were prepared by pressing lithium metal rectangles onto a nickel metal patch attached as above to 5 other stainless steel plates each measuring 3.93 x 2.28 x 0.005 centimeters.

A stainless steel plate 3.93 x 2.28 x 0.01 centimeters was disposed flush against the bottom of a polypropylene box with inside dimensions of 3.95 x 2.30 x 1.48 centimeters.

A nickel metal strip (external battery lead) spot welded to the plate exited the box through a bottom hole. The plate was sealed against the box bottom with epoxy resin.

Battery assembly was conducted in a dry argon atmosphere by first placing one of the cathode plates firmly against the bottom plate in the box with the cupric sulfide rectangle upwards. Next a polypropylene spacer having an inside opening measuring 3.8 x 2.1 centimeters, 0.28 centimeter thick and approximately coextensive with the box in outer edge dimensions, was pressed into the box around the cupric sulfide cathode. A glass wool pad coextensive with the interior of the spacer was then placed against the cupric sulfide surface inside the spacer opening. Next the first of the lithium anode plates was placed in the box against the spacer and the pad, lithium side facing the cupric sulfide. A cathode plate was then placed, steel-to-steel against the back of the first anode plate. A spacer and a pad were placed as before and the stacking continued until a stack of 4 back-to-back dipolar electrodes has been assembled in the box. A final spacer and pad were positioned and the last lithium-steel plate was placed on the stack lithium facing inward. A steel plate with attached external connector was placed against the back of the last anode plate and the box closed by sealing with a polypropylene cover through which cover the external connector exited via a hole.

The box was turned on edge and sealed in a stainless steel can with epoxy resin with the external connectors leading upward through the epoxy out of the can.

Three small holes were then drilled through the wall of the battery to the edge of the stack 13 and the battery was evacuated and then filled through the holes under about 7 kilograms per square centimeter of argon pressure with an electrolyte consisting essentially of 10 weight percent lithium chlorate, 23 weight percent 1,3-dimethoxyethane and 67 weight percent tetrahydrofuran. The holes were plugged and the battery removed from the argon atmosphere.

The battery was discharged in 47 hours through a 560 ohms load at 7.82 volts average voltage to a preselected cut-off voltage of 5.4 volts. Thus the battery delivered 7.82 × 47/560 or 0.656 ampere-hour. Since there was 0.90 ampere-hour of cupric sulfide available, 0.656/0.90 × 100 or 73% of the cathode material was utilized during discharge.

The following example demonstrates that such battery has substantial wet-stand capability.

Example 2

A battery prepared as in Example 1 was discharged for 4.25 hours each day over a period of 10.6 days. The average voltage was 7.90 volts to the cut-off voltage of 5.4 volts. Thus the battery delivered 7.90 × 4.25 × 10.6/560 or 0.636 ampere-hour, that is 0.636/0.90 × 100 or 71% cathode utilization.

Since the battery was either standing or discharging for a period of over 254 hours and since its output was essentially the same as that of the Example 1 battery which was used only 47 hours, it is apparent that intercell shorting did not consume a significant amount of electrode material during the 254 hours.

Upon examination after discharge such batteries showed substantial blocking of the channel 11 opening between the outer edges of the cathodes and the inner edges of the spacers with an adherent, brownish-white material. The spacers had increased dimensionally as had also the cathodes.

Example 3

Tests were performed to determine the percent dimension increase in plastic pieces exposed to representative battery electrolytes. The materials tested were polyethylene, polypropylene and polyethylene-polyvinylacetate copolymer. Data are shown in Table I.

TABLE I.—PERCENT LINEAR SWELLING OF PLASTIC PIECES IN SOLVENT

| Solvent | Polyethylene | | | Polypropylene | | | Polyethylene/polyvinyl acetate [1] | | |
|---|---|---|---|---|---|---|---|---|---|
|  | 20 hrs. 45° C. | 66 hrs. 25° C. | 168 hrs. 25° C. | 20 hrs. 45° C. | 66 hrs. 25° C. | 168 hrs. 25° C. | 20 hrs. 45° C. | 66 hrs. 25° C. | 168 hrs. 25° C. |
| Tetrahydrofuran | 7.0 | 3.7 | 6.5 | 4.0 | 2.5 | 2.4 | ([2]) | 13.9 | ([2]) |
| Ethylene glycol dimethyl ether | 1.1 | 1.1 | 1.3 | 2.0 | 0.8 | 0.7 | 13.5 | 8.8 | 14.0 |
| Diethylene glycol dimethyl ether | 0.0 | 0.6 | 0.0 | 0.3 | 0.0 | 0.7 | 6.6 | 1.7 | 6.5 |
| 1,3-dioxolane | 1.8 | 0.3 | 1.4 | 0.7 | 0.0 | 0.2 | 7.7 | 4.4 | 7.6 |
| Polypropylene carbonate | 0.4 | 0.6 | 0.6 | 0.4 | 0.1 | 0.1 | 0.2 | 0.0 | 0.3 |
| 3,5-dimethylisoxazole | 0.2 | 0.7 | 0.8 | 0.7 | 0.0 | 0.3 | 9.4 | 4.7 | 9.1 |

[1] 82%/18%.
[2] Disintegrated.

In the above table the percent swelling refers to the average change in linear dimension along the edges of the test piece.

The polyethylene tested was Du Pont "Alathon" 2010 having a melt index $$\left(\frac{\text{grams}}{10 \text{ minutes}}\right)$$

of 1.9 and a softening point of 205° F. The polypropylene was Amoco No. 4016 with a melt index of 8.0 and a softening point of 230° F. The polyethylene/polyvinyl acetate copolymer was Du Pont "Alathon" EVA 3170 with a melt index of 2.5 and a softening point of 140° F.

The embodiments of the invention in which an exclusive property or privilege is claimed are defined as follows:

1. An improved galvanic battery with good intercell electrical resistance comprising a plurality of series connected cells, a common electrolyte, and means for electrolyte transfer between cells, in which each of the cells comprises an anode and a cathode with a portion of said common electrolyte disposed therebetween, said improvement comprising (1) non-conductive spacing gaskets between the cells permitting filling of the battery with electrolyte, composed of a polymer material swellable in said electrolyte to the extent of from 1% to 10% linearly which swells to substantially fill spaces defined by electrode edges and extending edges of conductive plates attached to the electrodes thereby narrowing intercell channels, and (2) employing as the common electrolyte a non-aqueous electrolyte having a conductivity of less than about $5 \times 12^{-2}$ ohm$^{-1}$ cm.$^{-1}$ and a limited solubility for discharge products of the cells such that the concentration of said discharge products exceeds their solubility causing deposits of cell discharge products in the intercell channels.

2. The galvanic battery of claim 1 in which the electrodes are stacked in closely spaced relationship, the electrode face area is substantially larger than electrode edge area and the electrode edge forms a portion of the intercell channel.

3. The galvanic battery of claim 2 in which the electrodes are bipolar electrodes comprising an anode and a cathode operably attached to opposite faces of a plate of conductive electrolyte impervious material.

4. The galvanic battery of claim 3 in which edges of both the anode and cathode are recessed from the adjacent edge of the plate of conductive electrolyte impervious material to which said anode and cathode are attached, the area of the recessed anode and cathode edges form a portion of the intercell channel, the electrodes are held in spaced relationship to one another by nonconductive spacers disposed in the recessed anode and cathode areas of the electrodes and the nonconductive spacers form at least one wall of the intercell channel.

5. The galvanic battery of claim 1 in which the anode comprises a metal selected from the group consisting of light metals of Group I–A, Group II–A or Group III–A of the Periodic Chart, the electrolyte comprises a normally liquid solution of a conductive salt in a non-aqueous solvent which has a conductivity of from about $1 \times 10^{-3}$ to about $5 \times 10^{-2}$ ohm$^{-1}$ cm.$^{-1}$ and is compatible with the metal anode and the cathode is a compatible depolarizing cathode.

6. The galvanic battery of claim 2 in which the anode comprises a metal selected from the group consisting of lights metals of Group I–A, Groug II–A or Group III–A of the Periodic Chart, the electrolyte comprises a normally liquid solution of a conductive salt in a non-aqueous solvent which has a conductivity of from about $1 \times 10^{-3}$ to about $5 \times 10^{-2}$ ohm$^{-1}$ cm.$^{-1}$ and is compatible with the metal anode and the cathode is a compatible depolarizing cathode.

7. The galvanic battery of claim 3 in which the anode comprises a metal selected from the group consisting of light metals of Group I–A, Group II–A or Group III–A of the Periodic Chart, the electrolyte comprises a normally liquid solution of a conductive salt in a non-aqueous solvent which has a conductivity of from about $1 \times 10^{-3}$ to about $5 \times 10^{-2}$ ohm$^{-1}$ cm.$^{-1}$ and is compatible with the metal anode and the cathode is a compatible depolarizing cathode.

8. The galvanic battery of claim 4 in which the anode comprises a metal selected from the group consisting light metals of Group I–A, Group II–A or Group III–A of the Periodic Chart, the electrolyte comprises a normally liquid solution of a conductive salt in a non-aqueous solvent which has a conductivity of from about $1 \times 10^{-3}$ to about $5 \times 10^{-2}$ ohm$^{-1}$ cm.$^{-1}$ and is compatible with the metal anode and the cathode is a compatible depolarizing cathode.

9. The galvanic battery of claim 5 in which the anode is lithium, the electrolyte is selected from the group consisting of lithium perchlorate dissolved in tetrahydrofuran, lithium perchlorate dissolved in tetrahydropyran, lithium perchlorate dissolved in a mixture of tetrahydrofuran, lithium perchlorate dissolved in a mixture of 1,3-dioxolane and a minor amount of 3,5-dimethylisoxazole and 1,2-dimethoxyethane and lithium hexafluorophosphate dissolved in methyl acetate and the cathode is selected from the group consisting of cupric sulfide, cuprous sulfide, cupric oxide, cuprous oxide, basic cupric carbonate, cupric oxalate, cupric tartrate, nickel fluoride, nickel oxalate, silver fluoride and cadmium fluoride.

10. The galvanic battery of claim 6 in which the anode is lithium, the electrolyte is selected from the group consisting of lithium perchlorate dissolved in tetrahydrofuran, lithium perchlorate dissolved in tetrahydropyran, lithium perchlorate dissolved in a mixture of tetrahydrofuran, lithium perchlorate dissolved in a mixture of 1,3-dioxolane and a minor amount of 3,5-dimethylisoxazole and 1,2-dimethoxyethane and lithium hexafluorophosphate dissolved in methyl acetate and the cathode is selected from the group consisting of cupric sulfide, cuprous sulfide, cupric oxide, cuprous oxide, basic cupric carbonate, cupric oxalate, cupric tartrate, nickel fluoride, nickel oxalate, silver fluoride and cadmium fluoride.

11. The galvanic battery of claim 7 in which the anode is lithium, the electrolyte is selected from the group consisting of lithium perchlorate dissolved in tetrahydrofuran, lithium perchlorate dissolved in tetrahydropyran, lithium perchlorate dissolved in a mixture of tetrahydrofuran, lithium perchlorate dissolved in a mixture of 1,3-dioxolane and a minor amount of 3,5-dimethylisoxazole and 1,2-dimethoxyethane and lithium hexafluorophosphate dissolved in methyl acetate and the cathode is selected from the group consisting of cupric sulfide, cuprous sulfide, cupric oxide, cuprous oxide, basic cupric carbonate, cupric oxalate, cupric tartrate, nickel fluoride, nickel oxalate, silver fluoride and cadmium fluoride.

12. The galvanic battery of claim 8 in which the anode is lithium, the electrolyte is selected from the group consisting of lithium perchlorate dissolved in tetrahydrofuran, lithium perchlorate dissolved in tetrahydropyran, lithium perchlorate dissolved in a mixture of tetrahydrofuran, lithium perchlorate dissolved in a mixture of 1,3-dioxolane and a minor amount of 3,5-dimethylisoxazole and 1,3-dimethoxyethane and lithium hexafluorophosphate dissolved in methyl acetate and the cathode is selected from the group consisting of cupric sulfide, cuprous sulfide, cupric oxide, cuprous oxide, basic cupric carbonate, cupric oxalate, cupric tartrate, nickel fluoride, nickel oxalate, silver fluoride and cadmium fluoride.

13. The galvanic battery of claim 4 in which the anode is lithium, the electrolyte consists essentially of about 10 weight percent lithium perchlorate, about 23 weight percent 1,2-dimethoxyethane and about 67 weight percent tetrahydrofuran, the cathode consists essentially of cupric sulfide, the conductive plate is stainless steel and the spacers are polypropylene.

References Cited
UNITED STATES PATENTS

| | | | |
|---|---|---|---|
| 3,238,800 | 1/1966 | Kirk | 136—100 R |
| 3,488,220 | 1/1970 | Lyall et al. | 136—6 |
| 3,542,601 | 11/1970 | Gabono | 136—100 R |
| 3,511,716 | 5/1970 | Gabono et al. | 136—100 R |
| 3,625,769 | 12/1971 | Lyall | 136—83 R |
| 3,639,174 | 2/1972 | Kegelman | 136—155 |

ALLEN B. CURTIS, Primary Examiner

C. F. LE FEVOUR, Assistant Examiner

U.S. Cl. X.R.

136—83 R